Nov. 14, 1950     J. B. PARSONS     2,529,570
REGULATOR MECHANISM
Filed Jan. 8, 1947
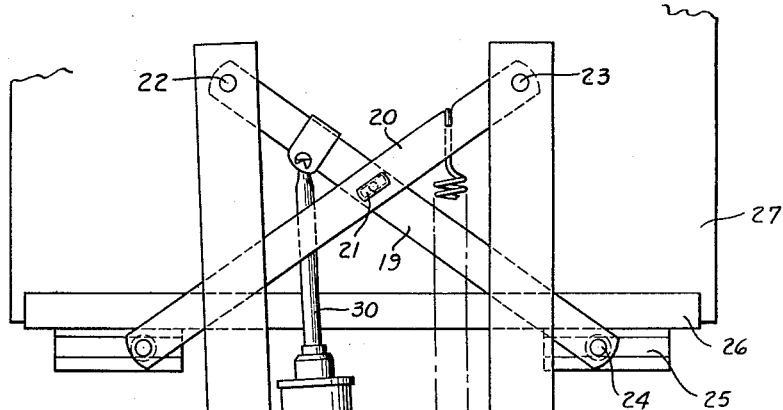
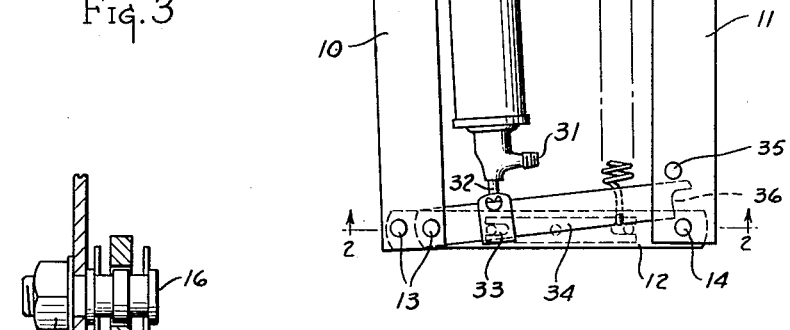
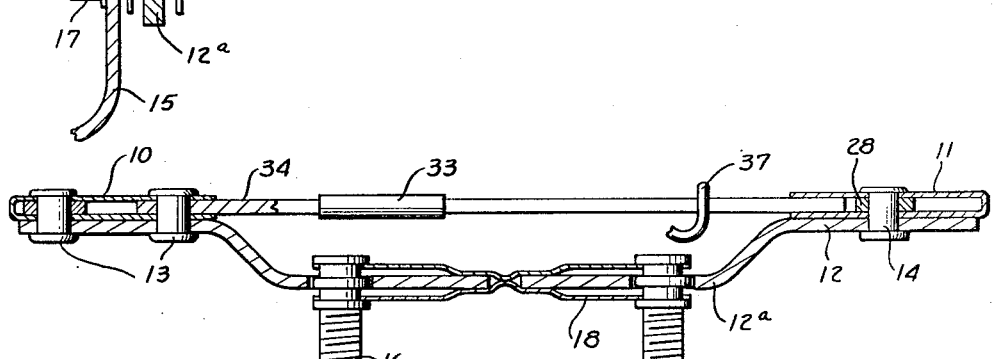
INVENTOR.
JOHN B. PARSONS

Patented Nov. 14, 1950

2,529,570

UNITED STATES PATENT OFFICE 2,529,570

REGULATOR MECHANISM

John B. Parsons, Toledo, Ohio

Application January 8, 1947, Serial No. 720,848

1 Claim. (Cl. 268—125)

This invention relates to regulator mechanisms such, for example, as mechanism for raising and lowering the windows of automobiles, and an object is to produce a regulator which is particularly suited for the actuation of vehicle window panels which constitutes a unitary assembly for installation in the window well and is designed to occupy a minimum amount of space, the regulator having power actuating means whereby the window may be actuated in one direction by pressure fluid and in the opposite direction by spring means. Although the regulator is admirably adapted for vehicle window operation, it may be used to advantage in other locations such, for example, as vehicle seat adjustment, the salient feature residing in the structural design by which the assembly occupies a relatively small amount of space.

Other objects and advantages will hereinafter appear, and for purposes of illustration but not of limitation, an embodiment of the invention is shown in the accompanying drawings, in which Figure 1 is a side elevation of a regulator mechanism connected to operate a vehicle window panel, employing a hydraulic piston and cylinder assembly for actuating the same in one direction and a spring for actuation in the opposite direction;

Figure 2 is an enlarged transverse sectional view substantially on the line 2—2 of Figure 1; and Figure 3 is an enlarged fragmentary sectional view of the lower portion of the regulator mechanism showing it mounted to a supporting panel.

In the regulator, for example, shown on Figure 1 of my Patent 2,400,572, dated May 21, 1946, and entitled "Regulator Mechanism Unit," some difficulty has been experienced in mounting it in automobile bodies where the space is extremely limited. It is to be understood that the length of window travel may be uniform but the space limitations are such that some redesign of the regulator was found to be necessary to produce an assembly which would accommodate the limited space but at the same time would effect substantially the same window travel. This desideratum has been accomplished by the structure hereinafter described.

In the drawings, the frame comprises upright side bars or stanchions 10 and 11 which are connected at their lower ends by a cross bar 12, the intermediate portion of which is embossed outwardly as indicated at 12a to provide a substantially central portion spaced outwardly from but in parallel relationship to the end portions to which the stanchions 10 and 11 are connected. The cross bar 12 is rigid with the stanchion 10 and is connected thereto by a pair of rivets 13 and the stanchion 11 is pivotally connected to the opposite end of the cross bar 12 by a single rivet 14. As shown on Figure 2, the stanchions 10 and 11 are of channel shape and are formed by folding a strip of relatively light gauge metal upon itself and in this instance, the cross bar is disposed on the outer side of the stanchions at the extreme lower ends thereof. The embossed portion 12a of the cross bar 12 may be mounted on a suitable supporting panel 15 forming part of the automobile body or door structure by shouldered bolts 16 passing therethrough, the outer ends receiving nuts 17. Spring members 18 are disposed on opposite sides of the embossed portion 12a and the ends are slotted to fit between the shouldered portion of the bolts 16 and by fitting the bolts somewhat loosely in the cross bar, a limited amount of rocking movement of the assembly during the operation of the window regulator is afforded. A mounting of this character is shown and described in my Patent 2,398,852 dated April 23, 1946, and entitled "Vehicle Window Regulator Mechanism," and since the same forms no part of the present invention, further description is not considered necessary.

A pair of cross arms 19 and 20 are pivotally connected intermediate their ends by a rivet 21 and the inner end of the cross arm 19 extends between the channel portions of the stanchion 10 and is pivoted thereto by a rivet 22. The inner end of the arm 20 is similarly mounted on the stanchion 11 by a rivet 23. The outer ends of the cross arms 19 and 20 overlap the sides of the stanchions and the extreme outer ends are provided with studs 24 fitting horizontally elongate guides 25 which depend from a channel member 26 embracing the lower edge of the window glass or panel 27.

It is to be understood that interposed between the sides of each of the U-shaped stanchions in the region of the rivets 13, 14, 22 and 23 is a spacer sleeve 28 through which each rivet passes. Manifestly, the spacer sleeves insure that the parts can pivot freely and liability of the sides of the stanchions being deformed to crowd or interfere with the swinging movement, is prevented.

The regulator cross arms 19 and 20 are actuated in one direction, for example, to raise the window panel 27 by a piston operating in a cylinder 29 and having a piston rod 30 connected to the cross arm 19 between its pivotal mounting 22 and the pivotal connection 21. The cylinder 29 and piston rod 30 are disposed inside of the stanchion 10 and between the stanchions 10 and 11. Liquid is introduced to the cylinder through a connection 31 to which a suitable tube (not shown) may be attached so that liquid may be introduced under pressure to drive the piston and consequently, the piston rod 30, upwardly, thereby to cause upward swinging movement of the regulator arms. Depending from the cylinder 29 is a post 32 which is connected by a fastener 33 to a compensating or bracket arm 34. One end of the bracket arm 34 extends between the sides of the stanchion 10 and is pivotally mounted on one of the rivets 13 which secure the stanchion 10 to the cross bar 12. As shown, the bracket arm 34 is pivoted to the innermost rivet 13 so that such rivet not only assists in rigidly securing the stanchion 10 to the cross bar 12, but also provides a pivotal mounting for the bracket or compensating arm 34. The opposite end of the bracket arm 34 is disposed between the channel sides of the stanchion 11 and upward movement thereof is limited by a rivet 35 carried by the stanchion 11. It will be noted that the outer end portion is cut away as indicated at 36 so that the arm 34 may swing downwardly and clear the rivet 14 and be disposed substantially in parallel relationship to the cross bar 12 and in substantially flush alignment therewith.

Ordinarily, it will be understood that the compensating arm 34 is secured to the stanchion 10 above the cross bar 12 but this requires a somewhat longer assembly but by mounting the compensating arm in the manner above described, the over-all length of the assembly can be reduced. The offsetting of the cross bar 12 in the manner shown and described enables the assembly conveniently to be mounted on a suitable support and no interference with the swinging movement of the arm 34 is encountered.

A coil spring 37 has one end connected to the cross arm 20 between its pivotal point 23 and the center rivet 21, and the opposite end of the spring is hooked over the outer end portion of the compensating arm 34, the latter being notched to receive it. The spring operates to cause the cross arm to swing downwardly for lowering the window panel 27. At the same time, any liquid disposed within the cylinder 29 is forced out through the connection 31.

Reference is hereby made to my Patent 2,400,572 for a complete description of the operation of the above described regulator. Suffice it to say that there is disposed within the cylinder 29 a solenoid controlled valve and upon energizing the solenoid, the valve is unseated and liquid is forced through the connection 31 to cause the upward movement of the window panel 27 and during this movement, the stanchion 11 can rock relatively to the stanchion 10 for accommodating the various positions of the cross arm regulator. Manifestly during the upward movement of the window glass 27, the contractile coil spring 37 is placed under tension so that when the solenoid within the cylinder 29 is again energized to unseat its valve, the spring 37 lowers the window panel and at the same time forces the liquid from the cylinder. The window panel 27 is retained in any desired position of adjustment by the liquid trapped within the cylinder 29.

The bracket or compensating arm 34 militates against damage to the parts. For example, when the window panel 27 is in its fully raised position and any expansion of the liquid within the cylinder 29 takes place, the arm 34 is adapted to rock thereby to compensate for such expansion and thereby prevent the window or regulator parts from becoming broken or damaged.

It will be apparent from the above description that the over-all height of the regulator assembly is substantially reduced by the unique mounting of the compensating or bracket arm 34 with relation to the cross bar 12 and the embossing of the latter to accommodate the compensating lever movement and parts secured thereto. This enables the assembly to be mounted in a smaller space without sacrificing the desired movement of the regulator arms to effect full opening and closing movements to the window panel.

It is to be understood that numerous changes in details of construction, arrangement and operation may be effected without departing from the spirit of the invention especially as defined in the appended claim.

What I claim is:

A regulator mechanism comprising a frame having a pair of laterally-spaced stanchions, a cross bar extending between the adjacent portions of said stanchions at one end, said cross bar having end portions overlapping the last-mentioned ends of said two stanchions, a pivot connecting one end portion of said cross bar and one stanchion, the opposite end of said one stanchion being relatively moveable toward and away from the other stanchion, the intermediate portion of said cross arm being embossed outwardly to lie in a plane outside the plane of said stanchions, a pair of spaced rivets fixedly connecting the other end portion of said cross bar to the other stanchion, a pair of cross arms pivoted together intermediate their ends, pivotal connections between corresponding ends of their arms and said stanchions, and means for swinging said arms whereby the pivotally mounted stanchion rocks toward and away from the other stanchion during the swinging of said cross arms from one extreme position to the other, the last-named means including a piston having a piston rod pivoted to one of the cross arms, a cylinder for said piston, a compensating arm for said cylinder pivotally supported at one end on one of said pair of spaced rivets in substantially overlapping relation to the adjacent end of said cross arm, said compensating arm extending between said stanchions and lying generally horizontally opposite said cross arm, a stop on said one stanchion for said compensating arm for limiting the upward swinging movement thereof, the lower portion of the free end of said compensating arm being cut away to enable same to swing downwardly against said pivot substantially into position of alignment with respect to said cross bar, and a coil spring connected to the other cross arm at the other end and to said compensating arm at the other end.

JOHN B. PARSONS.

REFERENCES CITED

The following references are of record in the file of this patent:

UNITED STATES PATENTS

| Number | Name | Date |
|---|---|---|
| 2,212,220 | Zwierzina | Aug. 20, 1940 |
| 2,383,154 | Parsons | Aug. 21, 1945 |
| 2,398,852 | Parsons | Apr. 23, 1946 |
| 2,400,572 | Parsons | May 21, 1946 |